United States Patent
Kelleher et al.

(10) Patent No.: US 7,163,707 B2
(45) Date of Patent: *Jan. 16, 2007

(54) FOOD PRODUCT AND PROCESS FOR REDUCING OIL AND FAT CONTENT IN COOKED FOOD

(75) Inventors: Stephen D. Kelleher, Wakefield, MA (US); Peter G. Williamson, Gloucester, MA (US)

(73) Assignee: Proteus Industries, Inc., Gloucester, MA (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/991,637

(22) Filed: Nov. 18, 2004

(65) Prior Publication Data

US 2005/0069626 A1    Mar. 31, 2005

Related U.S. Application Data

(63) Continuation-in-part of application No. 10/378,139, filed on Mar. 4, 2003, now Pat. No. 6,855,364, which is a continuation-in-part of application No. 10/252,873, filed on Sep. 24, 2002, now abandoned.

(60) Provisional application No. 60/529,929, filed on Dec. 16, 2003, now abandoned.

(51) Int. Cl.
*A23L 1/212*    (2006.01)
*A23L 1/214*    (2006.01)
*A23L 1/216*    (2006.01)
*A23L 1/314*    (2006.01)

(52) U.S. Cl. .................. 426/281; 426/615; 426/637; 426/641; 426/643; 426/644; 426/646; 426/657

(58) Field of Classification Search .................. 426/92, 426/281, 615, 637, 641, 643, 644, 646, 657
See application file for complete search history.

(56) References Cited

U.S. PATENT DOCUMENTS

| | | | |
|---|---|---|---|
| 3,989,847 A | 11/1976 | Kurihara et al. | 426/7 |
| 6,005,073 A | 12/1999 | Hultin et al. | 530/412 |
| 6,136,959 A | 10/2000 | Hultin et al. | 530/412 |
| 6,288,216 B1 | 9/2001 | Hultin et al. | 530/412 |
| 6,451,975 B1 | 9/2002 | Hultin et al. | 530/350 |

FOREIGN PATENT DOCUMENTS

GB    2048051    12/1980

OTHER PUBLICATIONS

Onondenalore et al., Journal of Aquatic Food Product Technology, vol. 5(4) (1996), pp. 43-59.
Chawla et al., Journal of Food Science, vol. 61, No. 2, (1996), pp. 362-366, 371.
Venugopal et al., Thermostable Water Dispersions of Myofibrilla Protein from Atlantic Mackerel, (*Scomber scrobus* 7), Journal of Food Science, vol. 59, No. 2, pp. 265-276.
Cuq et al., Edible Packaging Films based on Fish Myofibrilla Proteins: Formulation and Functional Properties, Journal of Food Science, vol. 60, No. 6, pp. 1369-1374.
Shahidi et al., Notes & Digests, Meat Focus International-Oct. (1983), pp. 443-445.
FSTA #1, Yang, FSTA AN #95(02): 50115, 1994.
FSTA #2, Salam, FSTA AN #94(12): 50080, 1994.
FSTA #3, Han-Ching, FSTA AN #94(04): R0024, 1993.
FSTA #4, Chen, FSTA AN #92(12): 50138, 1991.
FSTA, #5, Liu, FSTA AN #92(12): 50137, 1991.
FSTA #6, Pan, FSTA AN #92(12): 50136, 1991.
FSTA #7, Yang, FSTA AN #92(02): 50118, 1992.
FSTA #8, Kee, FSTA AN #92(02): 50122.
Onodenalore, et al., Protein Dispersions & Hydrolysates from Shark:, FSTA ABS #97(04): R0032, (1996).
Shahidi et al., "Water Dispersions of Myofibrillar Proteins From Capelin (*Mallotus villosum*)", Food Chemistry 53 (1995) pp. 51-54.
Shahidi et al., Sollubilization and Thermostability of Water Dispersions of Muscle Structured Proteins of Atlantic Herring (*Clupea horengus*), Journal of Agriculre Food Chemistry, vol. 42, No. 7, (1994), pp. 1440-1446.
"Sigma" catolog, 1995, p. 710.
Meinke et al., Some Factors Influencing The Production of Protein Isolates From Whole Fish, Journal of Food Science, vol. 37, (1972), pp. 195-198.
Meinke et al., Autolysis as a Factor in the Production of Protein Isolates From Whole Fish, Journal of Food Science, vol. 38, (1973), pp. 864-866.

*Primary Examiner*—Arthur L. Corbin
(74) *Attorney, Agent, or Firm*—Paul J. Cook

(57) ABSTRACT

A process for cooking a food in oil and/or fat is provided. A dry protein mixture, a dry alkaline protein mixture, an aqueous alkaline protein mixture or an aqueous acidic protein is added to a food prior to cooking. The dry protein mixture, dry alkaline protein mixture, aqueous alkaline protein mixture and aqueous acidic protein solution comprise myofibrillar proteins and sarcoplasmic proteins substantially free of myofibrils and sarcomeres. The amount of oil and/or fat absorbed by the food during cooking is substantially reduced.

29 Claims, No Drawings

FOOD PRODUCT AND PROCESS FOR REDUCING OIL AND FAT CONTENT IN COOKED FOOD

REFERENCE TO RELATED APPLICATION

This application is based upon provisional application Ser. No. 60/529,929, filed Dec. 16, 2003, now abandoned and is a continuation-in-part of application Ser. No. 10/378,139, filed Mar. 4, 2003, issued as U.S. Pat. No. 6,855,364, Feb. 15, 2005, which, in turn, is a continuation-in-part of application Ser. No. 10/252,873, filed Sep. 24, 2002, now abandoned.

BACKGROUND OF THE INVENTION

This invention relates to a process for controlling oil and fat content in cooked food. More particularly, this invention relates to such a process which utilizes animal muscle protein or a peptide composition derived from animal muscle protein to control oil and fat content in food and to the food product utilized in the process.

Prior to the present invention, foods such as meat, vegetables, fish, nuts, pastry, fritters, doughnuts or the like cooked at an elevated temperature in oil and/or fat absorb the oil and/or fat. These cooking processes are commonly referred to as "deep fat frying" or as "sautéing". When the food is only partially cooked in fat and/or oil, the cooked food is referred to as "par fried". The fried food then is subsequently fully cooked such as by baking. When cooked in this manner, the cooked food undesirably absorbs the fat or oil thereby reducing its nutritional and dietary value. A prior solution for reducing fat or oil absorption by the food during cooking is to coat the food with a substance such as pectin prior to contacting the food with the heated oil or fat. This solution is undesirable since significant oil or fat absorption by the food still occurs.

Accordingly, it would be desirable to provide a form of food including fish, meat, vegetables, pastry or the like which can be cooked while minimizing or preventing absorption of oil or fat by the food during cooking. In addition, it would be desirable to provide such a form of food which is not less nutritional than the original food or which is even more nutritional than the original food to be cooked. In addition, it would be desirable to provide such a form of food wherein the majority of moisture or added flavors or spices in the uncooked food is retained during cooking.

SUMMARY OF THE INVENTION

In accordance with this invention, uncooked food to be cooked with liquid oil and/or fat, including butter is coated, injected and/or admixed with a dry protein mixture or an aqueous acidic solution of protein mixture derived from animal muscle tissue and/or with a peptide composition derived from the mixture or from the aqueous acidic solution of protein mixture. The protein mixtures comprise a mixture of myofibrillar proteins and sarcoplasmic proteins obtained by one of the processes disclosed in U.S. Pat. Nos. 6,005,073; 6,288,216; 6,136,959 and/or 6,451,975 all of which are incorporated herein by reference in their entirety. By the phrase, "dry protein mixture" as used herein is meant a dehydrated, protein mixture of myofibrillar proteins and sarcoplasmic proteins derived from animal muscle tissue and which is obtained from an aqueous acid solution (less than or equal to pH 4.0) or an aqueous alkaline solution (greater than or equal to pH 10.5). The dry protein mixture also contains less than about 15 weight percent water, preferably between about 3 and 10 weight percent water and most preferably between about 3 and 7 weight percent water based on the total weight of the protein mixture and water. While a dry protein mixture containing 0% water is useful in the present invention, dry powders, in general, containing 0 to 3 weight percent water can be dangerous to process on a commercial scale. Solid mixtures of myofibrillar proteins and sarcoplasmic proteins containing greater than about 15 weight percent water based on total weight of the protein mixture and water are undesirable in this invention since they are microbially unsound.

By the phrase "aqueous acidic protein solution" as used herein is meant an aqueous solution of myofibrillar proteins and sarcoplasmic proteins derived from animal muscle tissue and having a pH of 4.0 or less, preferably pH 3.5 or less and most preferably between about 2.5 and about 3.5 but not so low as to adversely affect the protein functionality. The aqueous acidic protein solution can be obtained directly from animal muscle tissue by the processes described below or by dissolving the dry protein mixture in water or in a pharmaceutically or food grade acceptable aqueous acidic solution.

By the phrase, "aqueous alkaline protein solution" as used herein is meant an aqueous solution of myofibrillar proteins and sarcoplasmic proteins having a pH from about 10.5 to about 12.0. The aqueous alkaline protein solution can be obtained directly from animal muscle tissue by the process described below. A dry alkaline protein mixture is obtained by drying the aqueous alkaline protein solution such as by lyophilization, evaporation or spray drying.

In accordance with this invention the dry protein mixture or dry alkaline protein mixture of myofibrillar proteins and sarcoplasmic protein, in powder form, dehydrated form or small particulate form or peptide composition derived from the dry protein mixture is applied to the surface of the food to be cooked, is injected into the food to be cooked and/or is mixed with the food (ground, minced or thinly sliced) to be cooked such as hamburger or sausage. Alternatively, the aqueous acidic protein solution or aqueous alkaline protein solution or peptide composition derived from the aqueous acidic protein solution or aqueous alkaline protein solution can be applied to the surface of the food or it can be mixed with the food or it can be injected into the food. The food containing the dry protein mixture, dry alkaline protein mixture, aqueous alkaline protein solution or aqueous acidic protein solution or peptide composition derived therefrom then can be cooked in liquid oil and/or fat at elevated temperature while minimizing absorption of oil and/or fat by the food. The difference in weight of fat and/or oil between food treated in accordance with this invention after being cooked in oil and/or fat compared with food without the dry protein mixture or aqueous acidic protein solution or peptide composition derived therefrom after being cooked in oil and/or fat is between about 10 and about 70%, more preferably, between about 30 and about 70% less oils and/or fat. In addition, since the amount of absorbed fat or oil utilized during cooking is substantially reduced, the amount of oil or fat needed to cook a given weight of food is correspondingly substantially reduced.

Alternatively, in accordance with this invention the dry alkaline protein mixture of myofibrillar proteins and sarcoplasmic protein, in powder form, dehydrated form or small particulate form or peptide composition derived from the dry alkaline protein mixture is applied to the surface of the food to be cooked, is injected into the food to be cooked, is injected into the food to be cooked and/or is mixed with the food (ground, minced or thinly sliced) to be cooked such as hamburger or sausage. Alternatively, the aqueous alkaline protein solution or peptide composition derived from the aqueous alkaline protein solution can be applied to the surface of the food or it can be mixed with the food or it can be injected into the food. The food containing the dry protein mixture or aqueous alkaline protein solution or peptide composition derived therefrom then can be cooked in liquid oil and/or fat at elevated temperature while minimizing absorption of oil and/or fat by the food. The difference in weight of fat and/or oil between food treated in accordance with this invention after being cooked in oil and/or fat compared with food without the dry alkaline protein mixture or aqueous alkaline protein solution or peptide composition derived therefrom after being cooked in oil and/or fat is between about 10 and about 70%, preferably, between about 30 and about 70% less oil and/or fat. In addition, since the amount of absorbed fat or oil utilized during cooking is substantially reduced, the amount of oil or fat needed to cook a given weight of food is correspondingly substantially reduced.

The peptide composition useful in the present invention is obtained by contacting the dry protein mixture, the aqueous acidic protein solution; the aqueous alkaline protein solution or the dry alkaline protein mixture with an enzyme composition which converts the protein to a peptide composition at the pH of the protein. The peptide composition can be a dry peptide composition, an aqueous acidic peptide composition, an aqueous alkaline peptide solution or a dry alkaline peptide mixture.

DESCRIPTION OF SPECIFIC EMBODIMENTS

In accordance with this invention, food to be cooked in oil and/or fat is coated, injected with and/or admixed with a dry protein mixture, a dry alkaline protein mixture, an aqueous acidic protein solution or an aqueous alkaline protein solution of myofibrillar proteins and sarcoplasmic proteins derived from animal muscle tissue and/or a peptide composition derived from the dry protein mixture, the dry alkaline protein mixture, the aqueous acidic protein solution or the aqueous alkaline protein solution. The dry protein mixture, dry protein alkaline mixture, aqueous alkaline protein solution and aqueous acidic protein solution are obtained by the processes disclosed in U.S. Pat. Nos. 6,005,073, 6,288,216, 6,136,959 and 6,451,975 all of which are incorporated herein by reference in their entirety. The peptide composition utilized in the present invention is obtained by contacting the dry protein mixture, the aqueous acidic protein solution, a dry alkaline protein mixture or an aqueous alkaline protein solution with an enzyme that converts the protein to a peptide. This dry protein mixture is obtained by one of four processes. In two processes, (acid processes) animal muscle tissue is formed into small tissue particles which are then mixed with sufficient acid to form a solution of the tissue having a pH of 4.0 or less, preferably 3.5 or less and most preferably between about 2.5 and about 3.5, but not such a low pH as to adversely modify the animal tissue protein. In one of these two processes, the solution is centrifuged to form a lowest membrane lipid layer, an intermediate layer of aqueous acidic protein solution and a top layer of neutral lipids (fats and oils). The intermediate layer of aqueous acidic protein solution then is separated from the membrane lipid layer or from both the membrane lipid layer and the neutral lipid layer. In a second of these two processes, no centrifugation step is effected since the starting animal muscle tissue contains low concentrations of undesired membrane lipids, oils and/or fats. In both processes, the protein mixture is free of myofibrils and sarcomeres. In both processes, the protein in the aqueous acidic protein solution is recovered after centrifugation (when used) or by drying the aqueous acidic solution, such as by evaporation, spray drying or lyophilization to form the dry protein mixture having the low pH it had when it was dissolved in the aqueous acidic protein solution. Alternatively, the aqueous acidic protein solution can be utilized with the uncooked food without drying the solution. It is preferred to utilize one of these two acid processes to obtain the dry protein mixture or the aqueous acidic protein solution. In another alternative process, the protein in the aqueous acidic protein solution can be precipitated and recovered and mixed with a pharmaceutically acceptable or food grade acid to form an aqueous acidic protein solution of a desired viscosity. In another alternative process, the proteins in the acidic protein solution can be raised to a pH between about 10.5 and 12 using base to form an aqueous alkaline protein solution.

In two other processes, (alkaline processes) which also provide a means for obtaining the dry alkaline protein mixture, animal muscle tissue is formed into small tissue particles which are then mixed with sufficient aqueous base solution to form a solution of the tissue wherein at least 75% of the animal muscle protein is solubilized, but not such a high pH as to adversely modify the animal tissue protein, i.e., a pH between about 10.5 and about 12. In one process, the solution is centrifuged to form a lowest membrane lipid layer, an intermediate aqueous protein rich layer and a top layer of neutral lipids (fats and oils). The intermediate aqueous alkaline protein-rich layer then is separated from the membrane lipid layer or from both the membrane lipid layer and the neutral lipid layer. In a second process, no centrifugation step is effected since the starting animal muscle proteins contain low concentrations of undesired membrane lipids, oils and/or fats. In both processes, the protein mixture is free of myofibrils and sarcomeres. In both of these processes, the aqueous alkaline protein solution can be recovered at this point. In both processes, the pH of the protein-rich aqueous phase can be lowered to a pH below about 4.0, preferably below about 3.5 and most preferably between about 2.0 and 3.5 to form the aqueous acidic protein solution. In both processes, the protein in the aqueous acidic protein solution is recovered after centrifugation (when used) by drying the aqueous acidic protein solution, such as by evaporation, spray drying or lyophilization to form a powder product having the low pH it had when it was dissolved in the aqueous acidic solution. Alternatively, the aqueous acidic protein solution can be applied directly to the food without drying. The protein in aqueous alkaline solution having a pH between about 10.5 and 12.0 recovered after centrifugation (when used) can be dried, such as by spray drying, evaporation or lyophilization to form a powder product.

The dry protein mixture, the dry alkaline protein mixture, the aqueous acidic protein solution or the aqueous alkaline protein solution then is coated or injected into and/or admixed with the uncooked food. The dry protein mixture, dry alkaline protein mixture, aqueous acidic protein solution, or aqueous acidic protein solution and/or peptide composition derived therefrom can be applied alone or in admixture with conventional food or nutritive additives such as breading or batter coatings, spice dry rubs, cracker meal, corn meal or the like. The dry protein mixture, the dry alkaline protein mixture, the aqueous alkaline protein solution or aqueous acidic protein solution and/or peptide composition derived therefrom can be coated on the surface of the uncooked food with an applicator or can be coated by immersion tumbling the uncooked food in the solution or in a marinade containing the acidic aqueous protein solution, the dry alkaline protein mixture, or the aqueous alkaline protein solution or dry acidic protein mixture in a container or tumbling or vacuum tumbling apparatus. The dry protein mixture, dry alkaline protein mixture, aqueous acidic protein solution or aqueous alkaline protein solution also can contain flavorants such as butter flavor or garlic flavor or the like.

In summary, the dry protein mixture, dry alkaline protein mixture, aqueous alkaline protein mixture or the aqueous acidic protein solution utilized in the present invention can be obtained by the following representative methods:

1. Reduce the pH of comminuted animal muscle tissue to a pH less than about 3.5 to form an acidic protein solution, centrifuge the solution to form a lipid-rich phase and an aqueous phase and recover an aqueous acidic protein solution substantially free of membrane lipids that can be used in this invention.

2. Spray dry the aqueous acidic protein solution obtained by method 1 to form a dry protein mixture substantially free of membrane lipids that can be used in the present invention.

3. Lyophilize or evaporate the aqueous acidic protein solution obtained by method 1 to form the dry protein mixture substantially free of membrane lipids that can be used in the present invention.

4. Increase the pH of the aqueous acidic protein solution from method 1 to about pH 5.0–5.5 to effect precipitation of the proteins and then readjust the protein back to a pH of about 4.5 or less using acid in a minimum volume to concentrate the aqueous acidic protein solution to between 1.6–15% protein.

5. Reduce the pH of comminuted animal muscle tissue to form an aqueous acidic protein solution that can be used in the present invention.

6. Spray dry the aqueous acidic protein solution obtained by method 5 to form the dry protein mixture that can be used in the present invention.

7. Lyophilize or evaporate the aqueous acidic protein solution obtained by method 5 to form the dry protein mixture that can be used in the present invention.

8. Increase the pH of the aqueous acidic protein solution from method 5 to about pH 5.0–5.5 to effect precipitation of the proteins and then readjust the protein back to a pH of about 4.0 or less using acid in a minimum volume to concentrate the aqueous acidic protein solution to between about 1.6–15% protein.

9. Increase the pH of comminuted animal muscle tissue to a pH above about 10.5, centrifuge the solution to form a lipid-rich phase and an aqueous phase and recover an aqueous alkaline protein solution. In one embodiment, reduce the pH of the aqueous alkaline protein solution to a pH of less than about 4.0 to obtain an aqueous acidic protein solution substantially free of membrane lipids that can be used in this invention. In a second embodiment, reduce the pH of the aqueous alkaline solution to about 5.0–5.5 to precipitate the protein, lower the pH of the precipitated protein to a pH of 4.0 or less to form a concentrated aqueous acidic protein solution and use the concentrated aqueous acidic solution or dry the solution and use the recovered dry protein.

10. Spray dry the aqueous acidic protein solution obtained by method 9 to form a dry protein mixture substantially free of membrane lipids that can be used in the present invention.

11. Lyophilize or evaporate the aqueous acidic protein solution obtained by method 9 to form the dry acidic protein mixture substantially free of membrane lipids that can be used in the present invention.

12. Increase the pH of the aqueous acidic protein solution from method 9 to about pH 5.0–5.5 to effect precipitation of the proteins and then readjust the protein back to a pH of about 4.0 or less using acid in a minimum volume to concentrate the aqueous acidic solution to between 1.6–15% protein.

13. Increase the pH of comminuted animal muscle tissue to a pH above about 10.5 to form the aqueous alkaline protein solution. In one embodiment, reduce the pH of the aqueous alkaline protein solution to below about 4.0 to form an aqueous acidic protein solution that can be used in the present invention. In a second embodiment, reduce the pH of the aqueous alkaline solution to about 5.0–5.5 to precipitate the protein, lower the pH of the precipitated protein to a pH of 4.0 or less to form a concentrated aqueous acidic solution and use the concentrated aqueous acidic protein solution or dry the solution and use the recovered dry protein mixture.

14. Spray dry the aqueous acidic protein solution obtained by method 13 to form a dry protein mixture that can be used in the present invention.

15. Lyophilize or evaporate the aqueous acidic protein solution obtained by method 13 to form the dry protein mixture that can be used in the present invention.

The protein products utilized in the present invention comprise primarily myofibrillar proteins that also contains significant amounts of sarcoplasmic proteins. The sarcoplasmic proteins in the protein product admixed with, injected into and/or coated on the uncooked food comprises above about 8%, preferably above about 10%, more preferably above about 15% and most preferably above about 18%, up to about 30% by weight sarcoplasmic proteins, based on the total weight of protein in the dry protein mixture, dry alkaline protein mixture, the aqueous alkaline protein solution and/or aqueous acidic protein solution.

The starting protein is derived from meat or fish, including shellfish muscle tissue. Representative suitable fish include deboned flounder, sole haddock, cod, sea bass, salmon, tuna, trout or the like. Representative suitable shellfish include shelled shrimp, crayfish, lobster, scallops, oysters or shrimp in the shell or like. Representative suitable meats include beef, lamb, pork, venison, veal, buffalo or the like; poultry such as chicken, mechanically deboned poultry meat, turkey, duck, a game bird or goose or the like.

In accordance with one embodiment of this invention, the dry protein mixture, dry alkaline protein mixture, aqueous alkaline protein solution or aqueous acidic protein solution of myofibrillar proteins and sarcoplasmic protein is mixed with one or more enzymes, which convert the protein to peptides thereby to produce a peptide composition which is added to food prior to cooking the food in order to retain moisture cooked food. The enzymes can be exoproteases and can be active to produce peptides at an acidic pH, an alkaline pH or a neutral pH. Representative suitable enzymes useful at acidic pH include Enzeco Fungal Acid Protease (Enzyme Development Corp., New York, N.Y.; Newlase A (Amano, Troy, Va.); and Milezyme 3.5 (Miles Laboratories, Elkhart, Ind.) or mixtures thereof. Representative suitable enzymes useful at alkaline pH include Alcalase 2.4 LFG (Novozyes, Denmark). Representative suitable enzymes useful at neutral pH include Neutrase 0.8 L (Novozymes, Denmark) and papain (Penta, Livingston, N.J.) or mixtures thereof. After, the peptides have been formed, their pH can be adjusted, either alone or in admixture with the protein composition of this invention to pH below about 4.0 or between about 10.5 and about 12.0 prior to applying them to an uncooked food to be cooked.

The enzymes utilized in amounts of between about 0.02% and about 2% preferably between about 0.05% and about 0.5% by weight based on the total weight of enzyme and protein at temperatures between about 4° C. and about 55° C., preferably between about 25° C. and about 40° C., for a time between about 5 mins. and about 24 hrs., preferably between about 0.5 hrs. and about 2 hrs. The enzyme can be inactivated by changing pH of the protein composition with which it is mixed. The peptides formed by reaction of the protein composition with the enzyme composition then can be recovered by drying the solution wherein the reaction takes place. Drying can be effected by evaporation, spray drying, freeze-drying or the like. The peptides produced are instantaneously soluble in water at neutral pH. The peptide composition can be added to uncooked food for the purposes set forth above.

The peptide products useful in this invention contain less than about 1 weight percent fats and oils (total), preferably less than about 0.2% weight percent fats and oils based on the weight of peptide. In addition, the peptide products utilized in the present invention contain less than about 2 weight percent ash, preferably less than about 0.2% weight percent fats and oils based on the weight of peptide. This low ash content is achieved by washing with water the protein starting material. Ash is defined as minerals, such as sodium, potassium, calcium, iron or phosphorous. In addition, the peptide products of this invention are instantly soluble in water to form a clear solution. Furthermore, the peptide products of this invention generally have lighter color whiteness units than the color whiteness units of a similar unhydrolyzed protein isolate from which they are derived as measured by a calorimeter with L, a, b capabilities. This lighter color is found with the hydrolyzed peptides of this invention derived from meats such as beef, pork or chicken as well as from dark muscle tissue from fish such as pelagic fish. This lighter color characteristic is desirable since it more easily permits dissolving the peptide product in water to form clear aqueous solutions.

Color whiteness index is determined by converting the L, a, b values utilizing the formula: $100[(100-L)^2+a^2+b^2]^{0.5}$. Color is measured using a tristimulus colorimeter utilizing the universally adopted "L, a, b" opponent-type scale developed by Richard Hunter as is well known in the art. "L" is a measure of light ranging from white to black. The "a" value measures the range from green to red, and the "b" value measures the range from blue to yellow. With these three coordinates, a three-dimensional value can be assigned to any color.

In accordance with this invention the aqueous acidic protein solution, aqueous alkaline protein solution, the dry alkaline protein mixture or the dry protein mixture of myofibrillar proteins and sarcoplasmic proteins, and/or the peptide composition derived therefrom is applied to a surface of uncooked food to be cooked, or is injected into and/or is mixed with the uncooked food to be cooked. In a preferred embodiment of this invention, the uncooked food is both injected with and coated with the protein and/or peptide composition set forth above. The dry protein mixture, dry alkaline protein mixture, aqueous alkaline protein solution or aqueous acidic protein solution can be utilized alone or in admixture with a peptide composition derived therefrom. Alternatively, the peptide composition can be added alone to the uncooked food.

The term "a surface" as used herein is a surface of uncooked food which is positioned 90 degrees from an adjacent surface or surfaces of the uncooked food. In addition, the term "a surface" can comprise the connecting surface connecting two adjacent surfaces positioned 90 degrees from each other. Preferably, the entire surface of the uncooked food is coated with the dry acidic protein mixture, dry alkaline protein mixture, aqueous alkaline protein solution or aqueous acidic protein solution. The uncooked food containing the protein and/or the peptide then can be cooked at elevated temperature in oil and/or fat while substantially preventing absorption of oil and/or fat by the food being cooked.

In one aspect of this invention, particulate food such as ground meat or fish, e.g. hamburger, or a food mixture such as a pastry for doughnuts is mixed with the dry protein mixture, dry alkaline protein mixture, aqueous alkaline protein solution or aqueous acidic protein solution comprising myofibrillar proteins and sarcoplasmic proteins and/or the peptide composition derived therefrom at a weight ratio usually comprising about 0.03 to about 18% weight of the protein mixture based on the weight of the uncooked food, preferably between about 0.5 and 10% weight based on the weight of uncooked food and most preferably comprising between about 0.5 to about 7% weight based on the weight of the uncooked food. In addition, the aqueous acidic protein solution, aqueous alkaline protein solution or peptide solution derived therefrom can be added to the food in the same ratios based on the weight of and/or peptide precooked food. When the dry protein mixture, dry alkaline protein mixture, aqueous alkaline protein mixture or aqueous acidic protein solution and/or peptide composition derived therefrom is applied to at least one surface of the food, the amount of the protein and/or peptide mixture added is the same weight ratio as set forth above when mixed with uncooked food. When utilizing less than about 0.03% weight protein and/or peptide mixture or aqueous acidic protein and/or peptide solution, prevention of oil and/or fat absorption is not observed. When utilizing greater than about 15% weight protein and/or peptide, the uncooked food can become undesirably hard.

Suitable oils and/or fats, including hydrogenated or non-hydrogenated oils which can be utilized to effect cooking of uncooked food are those conventionally used in cooking including lard, peanut oil, corn oil, vegetable oil, canola oil, olive oil, palm oil, coconut oil, sesame oil, sunflower oil, butter, mixtures thereof or the like.

The uncooked food which is modified in accordance with this invention comprises meat, poultry and fish, including shell fish, vegetables, such as potatoe or onion, tempura; nuts, mushrooms, flour based foods such as batter compositions, pastry compositions, chicken or the like. Representative suitable fish include deboned flounder, sole, haddock, cod, sea bass, salmon, tuna, trout or the like. Representative suitable shell fish include shelled shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, a game bird or goose or the like either in fillet form or in ground form such as hamburg. The meats can include the bone of the animal when the bone does not adversely affect the edibility of the meat such as spare ribs, lamb chops or pork chops. In addition, processed meat products which include animal muscle tissue such as a sausage composition, a hot dog composition, emulsified product or the like can be coated, injected or mixed with the dry protein mixture, dry alkaline protein mixture, aqueous alkaline protein solution or the aqueous acidic protein solution, or peptide composition derived therefrom or a combination of these addition methods. Sausage and hot dog compositions include ground meat or fish, herbs such as sage, spices, sugar, pepper, salt and fillers such as dairy products as is well known in the art. Representative vegetables include potato, carrot, cauliflower, onion, corn or the like. Additional foods include mushroom, nuts, batter compositions such as those comprising flour, egg and milk which can include additional food such as cornmeal, cracker meal or dusting meals.

The food containing the dry protein mixture, dry alkaline protein mixture, aqueous alkaline protein solution or aqueous acidic protein solution and/or the peptide composition then can be cooked with oil and/or fat in a conventional manner such as by deep fat frying, pan frying, or the like. It has been found that the uncooked food provided in accordance with this invention contains between about 10% and about 70%, preferably between about 30% and about 70% less oil and/or fat by weight as compared to the same uncooked food free of the protein nad/or peptide composition of this invention. The amount of fat or oil needed to cook a given weight of a given type of food also is correspondingly reduced.

In one aspect of this invention, it has been found that the addition of ethanol to the dry protein mixture, dry alkaline protein mixture, aqueous acidic protein solution, aqueous alkaline protein solution and/or peptide solution or to a coating such as a batter containing the dry protein and/or peptide mixture results in a further reduction of fat and/or oil in food cooked in fat and/or oil as compared to the addition of the protein and/or peptide without ethanol. The concentration of ethanol for which this effect is observed is between about 0.5 and about 5% by weight, preferably between about 1% and about 5% by weight based on the total weight of batter and added protein and/or peptide.

The following examples illustrate the present invention and are not intended to limit the same. Percent (%) reflects the comparative reduction of absorbed fat and/or oil in the compositions of this invention as compared to absorbed fat and/or oil by the untreated batter of the control (fat and/or oil grams of a composition of this invention of control X 100). All products were analyzed at Silliker Laboratory, Allentown, Pa. Analysis methods were: ash (AOAC 938.08); fat (AOAC 948.15); moisture (AOAC 952.08A); protein (AOAC 991.20.1); carbohydrates (calculation); calories from fat (calculation) and total calories (Atwater Factors).

EXAMPLE 1

Using Cod Proteins to Act as an Oil Barrier in Deep-Fat Frying

Hydrated batters were made by combining batter mix (Newly Weds Foods, Chicago, Ill.) with water, isolated cod protein and, in one case, ethanol. Cod protein was isolated using the techniques described in U.S. Pat. No. 6,005, 073 at pH 3.0. The final concentrations % by weight of the re-hydrated batters were:

TABLE 1

|  | #1 | #2 | #3 |
| --- | --- | --- | --- |
| Batter | 50% | 33% | 32.8% |
| Water | 50% | 61.7% | 60.3% |
| Cod protein |  | 5.3% | 5.3% |
| Ethanol |  |  | 1.6% |

All batter compositions had approximately the same viscosity. Four (4) oz. pre-cut portions of twice-frozen Alaska pollock were pre-battered with a thin batter mixture to allow adhesion of a pre-dust to the fish portion. The portions were then pre-dusted with cracker meal and shaken to remove free pre-dust. Twelve portions were subsequently dipped in one of the above (#1–#3) batters (four for each portion). The batter dipped pollock portions were deep fat fried all together at 350° F. until cooked in non-hydrogenated, canola oil, before being drained. The portions were subsequently frozen individually at −20° F. The total fat and/or oil results were 17.99% by weight for sample #1, 13.56 by weight for sample #2, and 11.58% by weight for #3. This translates into a 19.1% fat reduction for sample #2 versus the control (#1), and a 35.6% fat reduction for sample #3 versus the control.

EXAMPLE 2

Extracted Pollock Proteins to Reduce or Control Fat Up-Take in Breaded Commercial Fish Portions A pollock protein solution was manufactured according to U.S. Pat. No. 6,451,975 and concentrated using ultrafiltration and a 500,000 NWCO membrane filter (Koch Membrane, Wilmington, Mass.). Commercial 2.5 oz raw breaded pollock squares were obtained prior to frying.

Frozen Pollock pieces were ground (Stephan Micro-cut, Columbus, Ohio) and then acidified in phosphoric acid, pH 3.0 to from the pollock protein solution, 3 wt. % solution of dissolved solids. After ultrafiltration, a 3 Brix solution corresponding to an approximately 2 wt/% protein solution was recovered.

One half of the 2.5 oz Pollock portions were dipped into the pollock protein (3% Brix) and shaken to rid of excess protein (total 6% pick-up), prior to being placed into a deep-fat fryer to fully cook for approx. 3 min, 15 seconds. Controls were from the same lot of portions but were deep fat fried without any added protein. Product was frozen and analyzed by combining 3–4 replicate portions of each sample as a composite sample.

TABLE 2

| Analyte | Breaded pollock portion control | Breaded pollock portion with protein |
| --- | --- | --- |
| Ash (%) | 1.45 | 1.30 |
| Calories (cal/100 g) | 205 | 167 |
| Calories from Fat (cal/100 g) | 99 | 63 |
| Carbohydrates (%) | 12.3 | 12.5 |
| Fat (%) | 11.04 | 7.03 |
| Moisture (%) | 60.97 | 65.64 |
| Protein (%) | 14.23 | 13.50 |

The amount of fat lowered by utilizing the proteins was 36% in the breaded pollock portions.

EXAMPLE 3

Coating using Hydrolyzed Proteins to Reduce or Control Fat Up-Take in Fried Products A hake protein solution was manufactured according to U.S. Pat. No. 6,451,975 and concentrated using ultrafiltration and a 500,000 NWCO membrane (Koch Membrane, Wilmington, Mass.). Frozen hake pieces were ground (Stephan Micro-cut, Columbus, Ohio) and then acidified in phosphoric acid, pH 3.0 to from the pollock protein solution, 3 wt. % solution of dissolved solids. After ultrafiltration, a 3 Brix solution corresponding to an approximate 1.8–2 (permeate Brix % was between 1 and 1.2 wt/% protein solution was recovered. The hake protein solution was incubated with proteolytic enzymes for 60 min at 9.9° C. in separate beakers. The enzyme concentrations were at 0.1% (w/w). Pepsin (Fisher Chemical, Fair Lawn, N.J.) was added to product adjusted to pH 3.06. A substantial breakdown in viscosity of the enzyme treated protein solutions occurred during the incubation period. Using Zahn viscometers, viscosity readings, measured in Zahn seconds, were reduced by 16% in the pepsin treated samples. The hydrolyzed protein solutions were subsequently used as dips.

Wedges (0.75 oz) were cut from frozen pollock blocks and sequenced through a batter/pre-dust/batter/bread routine using a crunchy coating system (Newly Wed Foods, Chicago, Ill.). The breaded portions (1.5 oz.) were dipped into hydrolyzed protein solutions for approx. 1 sec and drained prior to being refrozen. The dipped frozen portions were fried for 23 s at 375° F. hydrogenated soybean oil, refrozen and analyzed.

TABLE 3

| Analyte | Control non-dip | Control Non-hydrolyzed dip pH 3.06 | Hydrolyzed protein (pepsin) dipped pH 3.06 |
|---|---|---|---|
| Total lipid (%) | 11.28 | 8.48 | 9.01 |

All samples were effective at reducing fat up-take during the frying process compared to the non-dipped control. The control non-dipped, and the non-hydrolyzed, pH 3.06 dip produced samples with the most acceptable colors. The amount of fat lowered by utilizing the peptides was 20.1% compared to the non-dipped control.

EXAMPLE 4

Coating using Aqueous Alkaline Proteins to Reduce or Control Fat Up-Take in Fried Products A hake protein solution was manufactured according to U.S. Pat. No. 6,451,975 and concentrated using ultrafiltration and a 500,000 NWCO membrane (Koch Membrane, Wilmington, Mass.). Frozen hake pieces were ground (Stephan Micro-cut, Columbus, Ohio) and then acidified in phosphoric acid, pH 3.0 to form the pollock protein solution, 3 wt. % solution of dissolved solids. After ultrafiltration, a 3% Brix solution corresponding to a 1.8–2 wt. % protein solution was recovered. An aliquot of hake protein solution was adjusted to alkaline pH (11.43) using 2N sodium hydroxide (food-grade) and used as a dip. Wedges (0.75 oz) were cut from frozen Pollock blocks and sequenced through a batter/pre-dust/batter/bread routine using a crunchy coating system (Newly Wed Foods, Chicago, Ill.). The breaded portions (1.5 oz.) were dipped into alkaline protein solutions for approx. 1 sec and drained prior to being refrozen. The dipped frozen portions were fried for 23 s at 375° F. hydrogenated soybean oil, refrozen and analyzed.

TABLE 4

| Analyte | Control non-dip | Aqueous alkaline dip pH 11.43 |
|---|---|---|
| Total lipid (%) | 11.28 | 7.13 |

The aqueous alkaline dip was effective at reducing fat up-take during the frying process compared to the non-dipped control. The pH 11.43 sample had a predominantly fishy odor prior to and after frying. The amount of fat lowered by utilizing the alkaline protein was 36.8%.

EXAMPLE 5

Extracted Chicken Proteins to Reduce or Control Fat Up-Take in Breaded and Battered Fried Chicken Products A chicken protein solution was manufactured according to U.S. Pat. No. 6,451,975 and concentrated using ultrafiltration and a 500,000 NWCO membrane filter (Koch Membrane, Wilmington, Mass.). Chicken pieces were ground (Stephan Micro-cut, Columbus, Ohio) and then acidified with phosphoric acid, pH 3.0 to form the chicken protein solution) 3% solution of dissolved solids. After, ultrafiltration, the 5% Brix solution corresponding to a 4.2 wt. % protein solution was recovered (permeate had a Brix % of 0.8). All batters, pre-dust and breading were purchased from Newly Weds Foods (Chicago, Ill.). Unfrozen 4 oz ground chicken patties were purchased and used as the material to be coated.

On the battered products, a control was made using a 50/50 mixture of batter and water. For the treated samples chicken proteins (5% Brix) were mixed into the dry batter material at a 50/50 mixture and readjusted to pH 3.0 using 2 N food-grade, phosphoric acid. Additional batter (approx. 10%) was added until the consistency matched the controls. The 4 oz patties were dipped into the batters and immediately placed into a 375° F. deep-fat fryer and par-fried for 45 seconds.

For the breaded samples, the 4 oz chicken patties were dipped into the chicken protein followed by a pre-dust cracker meal, then battered (no protein) and crumbed. The crumbed product was dipped in chicken proteins and shaken to rid of excess protein, prior to being placed into a deep-fat fryer to fully cook for approx. 3 min, 30 seconds. Product was analyzed by combining 3–4 replicate portions of each sample as a composite sample.

TABLE 5

| Analyte | Battered control | Battered with protein | Breaded control | Breaded with protein |
|---|---|---|---|---|
| Ash (%) | 1.56 | 1.53 | 1.75 | 1.68 |
| Calories (cal/100 g) | 265 | 218 | 270 | 229 |
| Calories from Fat (cal/100 g) | 170 | 125 | 127 | 105 |
| Carbohydrates (%) | 10.6 | 8.6 | 22.4 | 14.9 |

TABLE 5-continued

| Analyte | Battered control | Battered with protein | Breaded control | Breaded with protein |
|---|---|---|---|---|
| Fat (%) | 18.87 | 13.84 | 14.13 | 11.63 |
| Moisture (%) | 55.86 | 61.32 | 48.33 | 55.58 |
| Protein (%) | 13.10 | 14.68 | 13.36 | 16.24 |

The amount of fat lowered by utilizing the proteins was 26.4% in the battered products and 17.7% in the breaded products.

The invention claimed is:

1. The process for reducing absorption of fat and/or oil in uncooked food during cooking of the food with a fat and/or oil which comprises:
   (a) adding to said uncooked food about 0.03 to about 15% by weight of a protein composition and/or a peptide composition selected from the group consisting of a dry protein mixture of myofibrillar proteins and sarcoplasmic proteins derived from animal muscle tissue, an aqueous acidic protein solution, having a pH of about 3.5 or less, of myofibrillar proteins and sarcoplasmic proteins derived from animal muscle tissues, a peptide composition prepared by mixing an enzyme with myofibrillar proteins and sarcoplasmic proteins that are derived from animal muscle tissue, and mixtures thereof, said adding occurring by a method selected from the group consisting of applying said protein and/or peptide composition to at least one surface of said uncooked food, mixing said protein and/or peptide composition with said uncooked food, injecting said protein and/or peptide composition mixture into said uncooked food and a combination of said adding methods
   and (b) cooking said uncooked food and protein and/or peptide composition from step (a) in an oil and/or fat.

2. The process for reducing absorption of fat and/or oil in uncooked food during cooking of the food with a fat and/or oil which comprises:
   (a) adding to said uncooked food about 0.03 to about 15% by weight of a protein composition and/or a peptide composition selected from the group consisting of a dry alkaline protein mixture of myofibrillar proteins and sarcoplasmic proteins derived from animal muscle tissue, an aqueous alkaline protein solution, having a pH between about 10.5 and 12.0, of myofibrillar proteins and sarcoplasmic proteins derived from animal muscle tissue, a peptide composition prepared by mixing an enzyme with myofibrillar proteins and sarcoplasmic proteins that are derived from animal muscle tissue, and mixtures thereof, said adding occurring by a method selected from the group consisting of applying said protein and/or peptide composition to at least one surface of said uncooked food, mixing said protein and/or peptide composition with said uncooked food, injecting said protein mixture and/or peptide composition into said uncooked food and a combination of said adding methods
   and (b) cooking said uncooked food and protein and/or a peptide composition from step (a) in an oil and/or fat.

3. The process of claim 1 wherein the protein and/or peptide composition of myofibrillar proteins and sarcoplasmic proteins is applied to at least one surface of said uncooked food.

4. The process of claim 1 wherein the protein composition and/or peptide composition of myofibrillar proteins and sarcoplasmic proteins is applied to all surfaces of said uncooked food.

5. The process of claim 1 wherein the protein composition and/or peptide composition of myofibrillar proteins and sarcoplasmic proteins is mixed with said uncooked food.

6. The process of claim 1 wherein the protein composition and/or peptide composition is injected into said uncooked food.

7. The process of claim 1 wherein the protein composition and/or peptide composition is injected into said uncooked food and is applied to all surfaces of said uncooked food.

8. The process of claim 1 wherein said protein composition and/or said peptide composition is mixed with said uncooked food and is applied to all surfaces of said uncooked food.

9. The process of any one of claims 1, 2, 3, 4, 5, 6, 7 or 8 wherein said uncooked food is fish.

10. The process of any one of claims 1, 2, 3, 4, 5, 6, 7 or 8 wherein said uncooked food is shellfish.

11. The process of claim 10 wherein said shellfish is shrimp.

12. The process of claims 1, 2, 3, 4, 5, 6, 7 or 8 wherein said uncooked food is poultry.

13. The process of claim 12 wherein said poultry is selected from the group consisting of turkey, duck, goose, game bird and chicken.

14. The process of any one of claims 1, 2, 3, 4, 5, 6, 7 or 8 wherein said uncooked food is meat.

15. The process of claim 14 wherein said meat is selected from the group consisting of ham, beef, lamb, pork, veal, buffalo and venison.

16. The process of any one of claims 1, 2, 3, 4, 5, 6, 7 or 8 wherein said protein composition and/or peptide composition is derived from fish muscle tissue.

17. The process of any one of claims 1, 2, 3, 4, 5, 6, 7 or 8 wherein said protein and/or peptide composition is derived from poultry muscle tissue.

18. The process of any one of claims 1, 2, 3, 4, 5, 6, 7 or 8 wherein said protein composition and/or peptide composition is derived from meat muscle tissue.

19. The process of claim 18 wherein said protein composition and/or peptide composition is meat muscle tissue selected from the group consisting of beef, lamb, pork and mixtures thereof.

20. The process of any one of claims 1, 2, 3, 4, 5, 6, 7 or 8 wherein said protein composition and/or peptide composition is substantially free of animal membrane lipids.

21. The process of any one of claims 1, 5, 7 or 8 wherein said food is in a sausage composition.

22. The process of any one of claims 1, 5, 7 or 8 wherein said food is in a hot dog composition.

23. The process of claim 1 wherein said protein composition and/or peptide composition is a dry protein and/or a peptide composition of myofibrillar proteins and sarcoplasmic proteins prepared by mixing an enzyme with myofibrillar proteins and sarcoplasmic proteins that are derived from animal muscle tissue.

24. The process of claim 1 wherein said protein and/or peptide composition is an aqueous acidic protein and/or a peptide composition solution of myofibrillar proteins and sarcoplasmic proteins prepared by mixing an enzyme with myofibrillar proteins and sarcoplasmic proteins that are derived from animal muscle tissue.

25. The process of any one of claims 1, 3, 4, 5, 6, 7, 8, 23 or 24 wherein the pH of said dry protein mixture, said aqueous acidic protein solution and said peptide composition is between about 2.5 and about 3.5.

26. The process of any one of claims 1 or 2 wherein said uncooked food is a vegetable.

27. The process of claim 26 wherein said vegetable is potato.

28. The process of claim 26 wherein said vegetable is onion.

29. The process of any one of claims 1 or 2 wherein said food is a flour based food.

* * * * *

UNITED STATES PATENT AND TRADEMARK OFFICE
CERTIFICATE OF CORRECTION

| | | |
|---|---|---|
| PATENT NO. | : 7,163,707 B2 | Page 1 of 1 |
| APPLICATION NO. | : 10/991637 | |
| DATED | : January 16, 2007 | |
| INVENTOR(S) | : Stephen D. Kelleher and Peter G. Williamson | |

It is certified that error appears in the above-identified patent and that said Letters Patent is hereby corrected as shown below:

Claim 1, Column 13, line 26, replace "tissues" with --tissue--.

Signed and Sealed this

Twentieth Day of March, 2007

JON W. DUDAS
*Director of the United States Patent and Trademark Office*